Nov. 10, 1925.
C. RAPP
SHEARING APPARATUS
Filed March 20, 1925    4 Sheets-Sheet 2
1,561,022
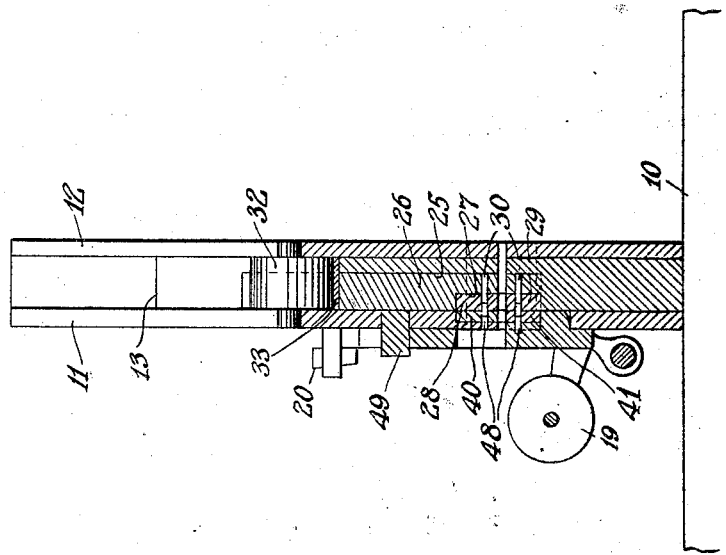
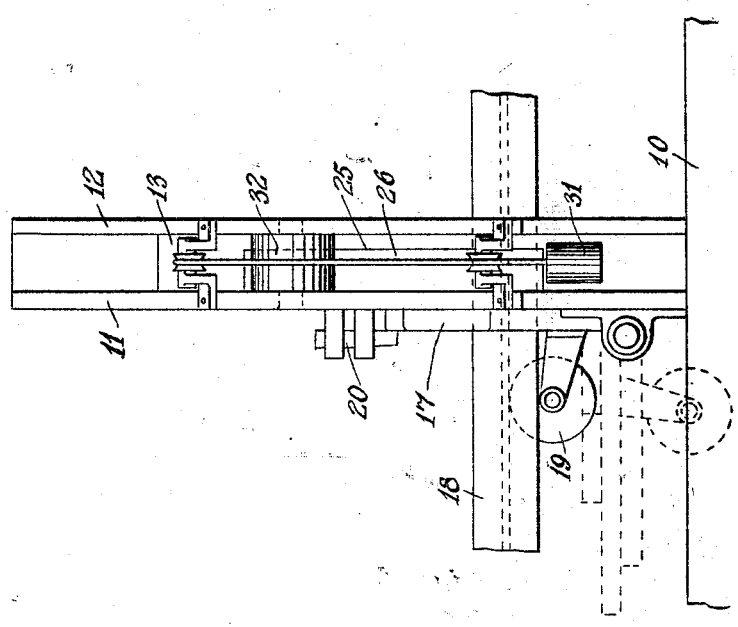
INVENTOR
Charles Rapp
BY
ATTORNEY Nov. 10, 1925.
C. RAPP
1,561,022
SHEARING APPARATUS
Filed March 20, 1925 4 Sheets-Sheet 3
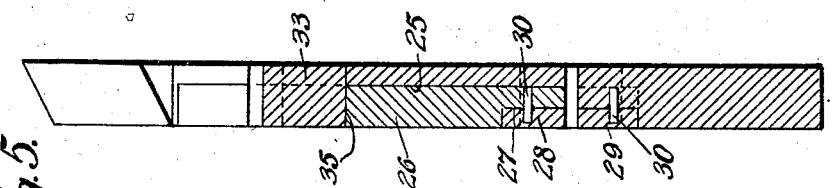
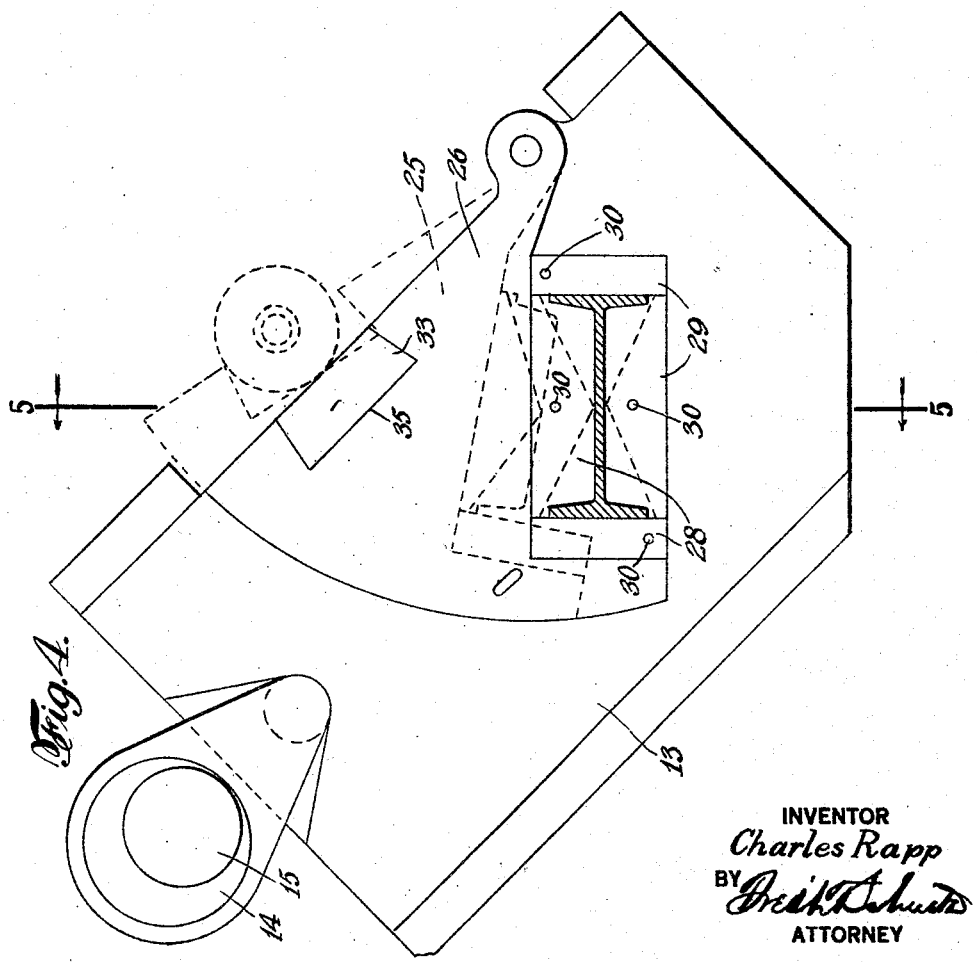
INVENTOR
Charles Rapp
BY
ATTORNEY Nov. 10, 1925.
C. RAPP
1,561,022
SHEARING APPARATUS
Filed March 20, 1925     4 Sheets-Sheet 4
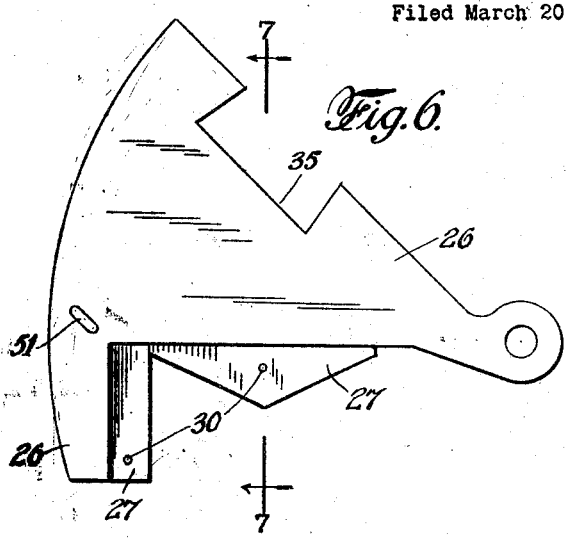
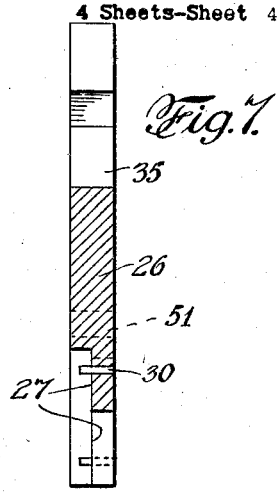
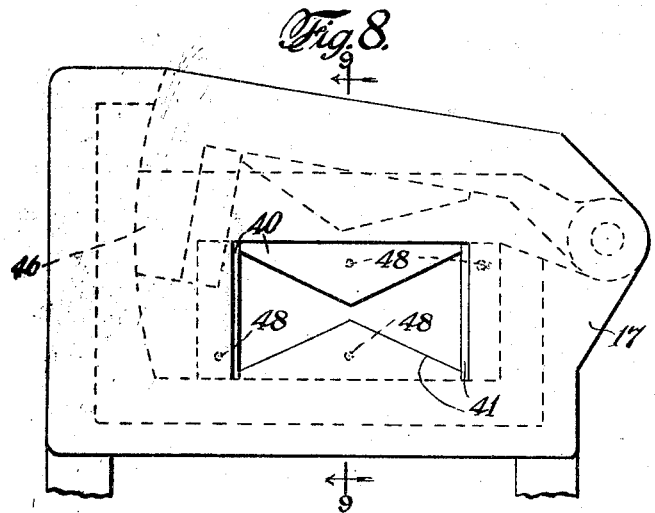
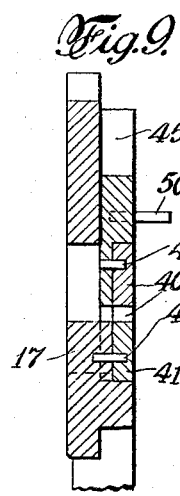
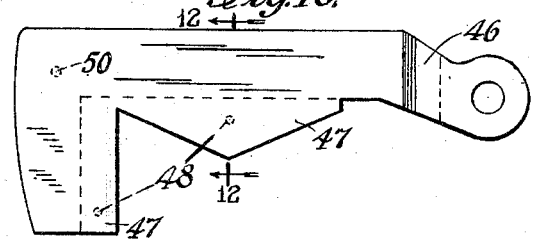
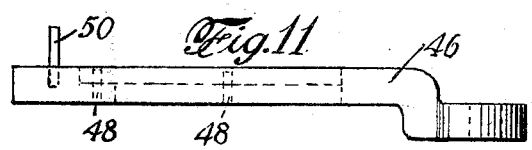
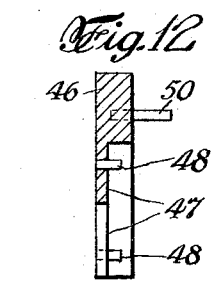
INVENTOR
Charles Rapp
BY
ATTORNEY Patented Nov. 10, 1925.

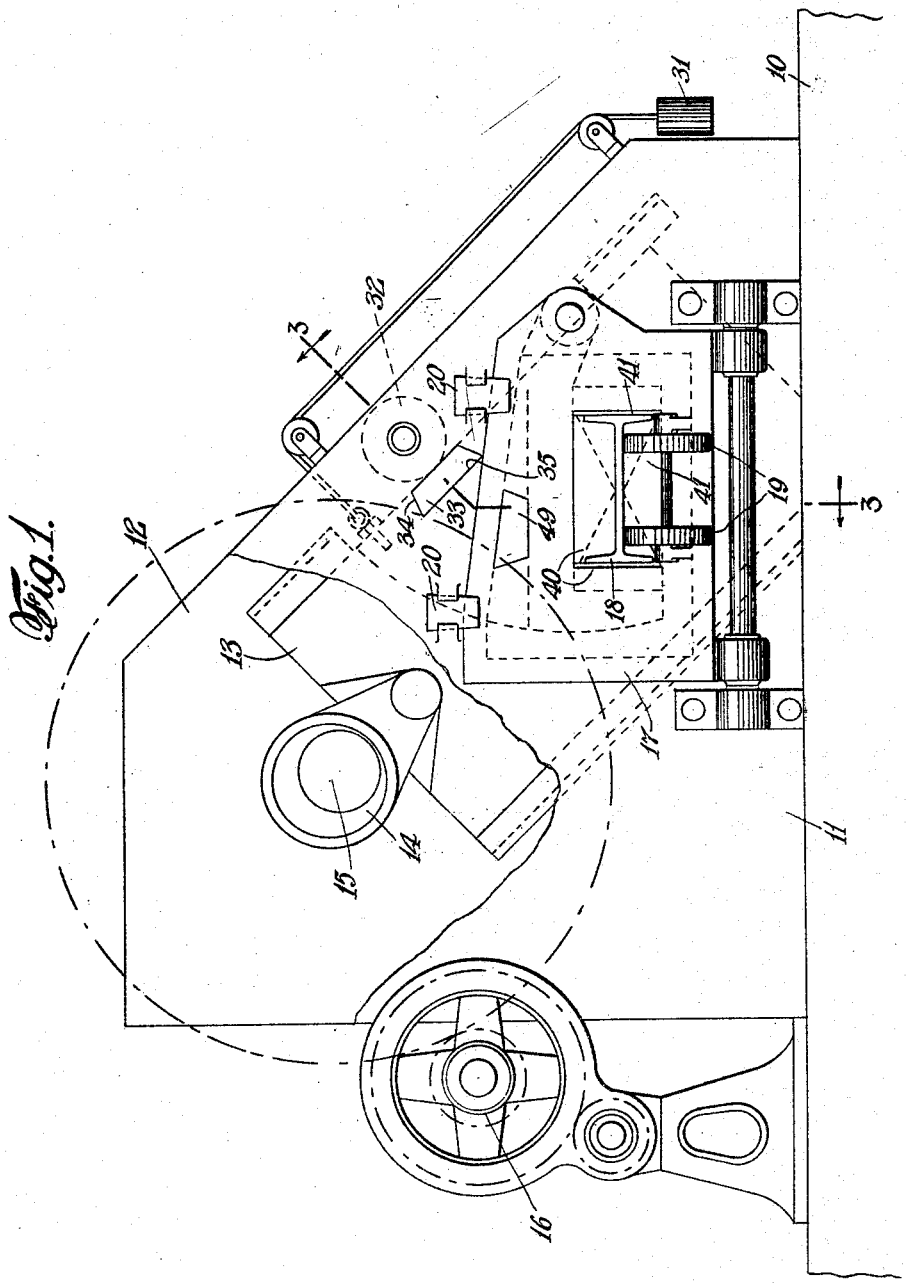

1,561,022

UNITED STATES PATENT OFFICE.

CHARLES RAPP, OF NEW YORK, N. Y.

SHEARING APPARATUS.

Application filed March 20, 1925. Serial No. 16,879.

*To all whom it may concern:*

Be it known that I, CHARLES RAPP, a citizen of Germany, residing at New York, in the county of New York and State of New York, have invented certain new and useful Improvements in Shearing Apparatus, of which the following is a specification.

The invention relates to shearing apparatus for fabricated metal of various sections, such as steel I-beams Z-bars, channels, etc.; and more particularly to the type of shearing apparatus employing a stationary and a movable set of shaped blades, that is to say, in which the profile of the particular member to be sheared is reproduced in blades which are mounted to surround the same and to have therewith a close fit in order to make a clean cut and avoid deformation of the member. It will be appreciated that while such apparatus provides for cutting without waste, yet the slightest irregularity in the member or burr on the end thereof will prevent insertion of such member between the blades. Should it be attempted to construct the opening of the shearing apparatus with sufficient clearance to pass such imperfect member, the tendency would be for the member to be distorted by the shearing action; and it is the object of the present invention to construct a shearing apparatus of the character aforesaid but wherein, in the initial setting of a member therein, sufficient opening may be temporarily provided to admit the member thru the opening notwithstanding any burr or other obstruction at its end or an irregularity in the shape of the member itself.

To this end, the invention consists in so mounting a portion of the blades of both the movable set and the stationary set of cutting members that the same may be permitted sufficient movement to allow of temporarily raising said portions to increase the opening for the member to be cut and thereby readily admit the same therethru.

The nature of the invention, however, will best be understood when described in connection with the accompanying drawings, in which—

Fig. 1 is a front elevation of the improved shearing apparatus, with portion of frame broken away to disclose one end of the ram and the reciprocating mechanism therefor.

Fig. 2 is an end view thereof.

Fig. 3 is a vertical transverse section taken on the line 3—3, Fig. 1, and looking in the direction of the arrows.

Fig. 4 is a detail elevation of the reciprocable ram and segmental blade carrier mounted thereon.

Fig. 5 is a vertical transverse section taken on the line 5—5, Fig. 4, and looking in the direction of the arrows.

Fig. 6 is an enlarged elevation of the segmental blade carrier of the movable set of blades and Fig. 7 is a transverse vertical section thereof, taken on the line 7—7, Fig. 6, looking in the direction of the arrows.

Fig. 8 is an enlarged front elevation of the cover plate with movable blade carrier mounted thereon and carrying the stationary set of cutting blades.

Fig. 9 is a vertical transverse section of the cover plate taken on the line 9—9, Fig. 8, and looking in the direction of the arrows.

Fig. 10 is an enlarged front elevation of the blade carrier associated with the cover plate; and Fig. 11 is a plan thereof.

Fig. 12 is a vertical transverse section taken on the line 12—12, Fig. 10, and looking in the direction of the arrows.

Referring to the drawings, the apparatus is shown as mounted upon a suitable base or bed plate 10 from which extend upwardly two separated frame plates 11 and 12 having mounted between them a ram 13 adapted to be reciprocated at an angle to the bed plate 10 in well known manner, for example by means of an eccentric 14 on a shaft 15 driven from a suitable motor device 16, also mounted on the bed plate 10. This ram is designed to carry a set of cutting blades, hereinafter more fully described, as is also a cover plate 17; but the blades of the latter are stationary and co-act with the former to effect the cutting of the member, as for example an I-beam 18 arranged to rest on a pair of rolls 19 carried by said cover plate in manner well understood. Similarly to the usual practice, the cover plate 17 is hinged to the frame plate 11 to swing outwardly therefrom, as indicated in the dotted lines, Fig. 2, so that access may conveniently be had to both the stationary and movable sets of blades for the purpose of replacing them when a member of different shape is to be sheared. Wedges 20 serve to retain the cover plate to the frame 11 when it is desired to operate the apparatus.

Contrary to the usual practice, however, a portion of each set of blades is arranged to be movable relatively to the remaining blades of the respective sets in order thereby to permit the opening between the blades to be enlarged temporarily and to a sufficient degree to accommodate or pass thru any member to be sheared and which may be bent or possess irregularities at the entrance end, such as burrs and the like, and which, with the present type of apparatus, are first required to be taken care of. To this end, a portion of the surface of the ram 13 is recessed to provide a depressed surface 25 and upon which is adapted to oscillate a segmental carrying member 26 pivotally attached for this purpose to the body of the ram. This carrier at its upper portion and one side is provided with recessed portions 27 for receiving a pair of blades 28, the arrangement being such that the outer surface of these blades will lie flush with the outer surface of the carrier whose surface in turn lies flush with the corresponding surface of the ram 13. A similar pair of blades 29 at the opposite side and bottom are provided in the same plane on the ram to complete the movable set of blades; and the same, as well as the blades 28, may be removably held thereon by fitting over respective pins 30. It will be appreciated that the opening which normally conforms precisely to the shape of the member to be cut may thus be enlarged by merely raising the segmental carrier 26, as in swinging the same relatively to the ram by which it is carried. To assist this action, a counter-weight 31 is arranged to act thereon thru a cable whose one end is attached to the outer edge of the carrier member. During the cutting operation, however, it will be necessary to insure the carrier member 26 against any outward movement; and to this end, a roller 32, rotatably mounted between the frame plates 11 and 12, is arranged to bear upon a removable block 33 which fits in and is slidable thru the ram and carrier member and removable thru an opening 34 in one of the frame plates, as the frame plate 11. So long as this block is in position, the roller 32 will bear thereon as well as on the corresponding edge of the ram as the latter reciprocates. When, however, it is desired to swing the carrier member 26 in order to accommodate a new piece to be cut, the block 33 is withdrawn, permitting thereby the carrier 26 to swing or be drawn outwardly until the said roller engages with the bottom 35 of the groove previously occupied by the block 33, as indicated in dotted lines, Fig. 4 of the drawings. It will be understood, of course, that as soon as a member 18 to be cut has been positioned in the shearing apparatus, the carrier 26 will be returned to its normal position with blades 28 in contact with said member and the block 33 returned to its locking position, whereupon the ram is moved to effect the shearing of the member.

Similarly, the cover member 17 is arranged to have the opening between its blades 40 and 41 enlarged to accommodate a beam or like member possessing irregularities as aforesaid. This is accomplished by providing the cover plate on its inner face with a recessed portion 45 in which is adapted to swing a carrier member 46 pivotally secured to said inner face of the cover plate, the carrier 46 being itself provided with recessed surfaces 47 for receiving the pair of blades 40. The latter are arranged to lie flush with the outer surface of said member 46 and may be removably held thereon, as well as the blades 41 to the cover plate, by pins 48. A movable block 49 may also be provided to slide transversely thru the cover plate and bear upon the upper edge of the carrier member 46 to insure against any tendency of the said member to rise during the shearing action relatively to said cover plate.

Furthermore, it is desirable to raise both of the movable portions of the two sets of blades simultaneously; and to this end, the member 46 is provided with a pin 50 projecting inwardly at right angles from its outer surface and adapted to fit, when the cover plate is in operative position, within a slot 51 of the carrier member 26, so that when the latter is drawn upwardly the former will follow and thus provide for enlarged openings at both sets of blades.

By the arrangement hereinbefore described, the well known shearing system, wherein each section to be cut requires its particular shaped cutting members but in which there is no waste of material in the cutting thereof, is enhanced in that it is not necessary to first prepare the member to be cut in order that it may be admitted between the blades. This results from the arrangement of movably or adjustably mounting a portion of the blades of both the shaped movable cutting member and the shaped stationaray cutting member such that the opening therebetween may be sufficiently enlarged temporarily for each set to admit a member to be cut. It will be appreciated, also, that by providing two pairs of individual blades for each cutting unit and removably mounting same, a convenient means is provided for replacing or for interchanging the said blades.

I claim:—

1. In shearing apparatus provided with a set of shaped movable blades and a set of cooperating shaped stationary blades: means to effect a relative movement between a portion of the blades of the movable set of blades; and means to effect a relative movement between a portion of the said stationary set of blades.

2. In shearing apparatus: a movable ram carrying a set of shaped movable blades; a member carried by the ram and bearing a portion of said movable blades, said member being movable relatively to the ram; a set of shaped stationary blades; and means to effect a relative movement between a portion of said stationary set of blades.

3. In shearing apparatus: a movable ram carrying a set of shaped movable blades; a member carried by the ram and bearing a portion of said movable blades, said member being movable relatively to the ram; a cover plate hingedly secured to the shearing apparatus and carrying a set of stationary blades; and a member carried by said plate and bearing a portion of the said set of stationary plates, said member being movable relatively to the cover plate.

4. In shearing apparatus provided with a set of shaped movable blades and a set of cooperating shaped stationary blades; means to effect a relative movement between a portion of the blades of the movable set of blades; means to effect a relative movement between a portion of the said stationary set of blades; and means to hold the relative movement effecting means of each set to each other to allow of moving both as a single unit.

5. In shearing apparatus provided with a set of shaped movable blades and a set of cooperating shaped stationary blades: means to effect a relative movement between a portion of the blades of the movable set of blades; means to effect a relative movement between a portion of the said stationary set of blades; and means to lock in position said relative movement effecting means.

6. In shearing apparatus: a movable ram carrying a set of shaped movable blades; a member carried by the ram and bearing a portion of said movable blades, said member being movable relatively to the ram; a cover plate hingedly secured to the shearing apparatus and carrying a set of stationary blades; a member carried by said cover plate and bearing a portion of the said set of stationary plates, said member being movable relatively to the cover plate; means to lock said ram movable member to the ram; and means to lock the said cover movable member to the cover.

In testimony whereof I affix my signature.

CHARLES RAPP.